United States Patent [19]

Pommer, II

[11] Patent Number: 4,634,814

[45] Date of Patent: Jan. 6, 1987

[54] SURGE PROTECTED ELECTRONIC SWITCH FOR TELEPHONE VOICEBAND CIRCUITS

[75] Inventor: Karl E. Pommer, II, Los Alamos, N. Mex.

[73] Assignee: GTE Communication Systems Corp., Northlake, Ill.

[21] Appl. No.: 697,672

[22] Filed: Feb. 4, 1985

[51] Int. Cl.⁴ ............................................. H04M 1/31
[52] U.S. Cl. ..................................... 379/377; 361/91; 361/111; 379/413
[58] Field of Search ............... 179/81 R, 84 R, 84 VF; 361/90, 91, 111, 107, 56

[56] References Cited

U.S. PATENT DOCUMENTS

| | | | |
|---|---|---|---|
| 4,167,654 | 9/1979 | Bolus et al. | 179/81 R |
| 4,329,546 | 5/1982 | Montesi et al. | 179/81 R |
| 4,360,710 | 11/1982 | Chaput et al. | 179/81 R |
| 4,555,597 | 11/1985 | Boeckmann et al. | 179/81 R X |

*Primary Examiner*—James L. Dwyer
*Attorney, Agent, or Firm*—Robert J. Black

[57] ABSTRACT

A fast response electronic switch used for control of connect and disconnect functions, primarily related to speech network applications for electronic-microprocessor based telephones utilizing dual tone multifrequency and/or universal pulse dial address signaling. Disclosed circuitry includes an active surge protector, a saturated transistor switch and bias circuit which exhibits a high AC impedance with respect to the telephone subscriber line.

8 Claims, 1 Drawing Figure

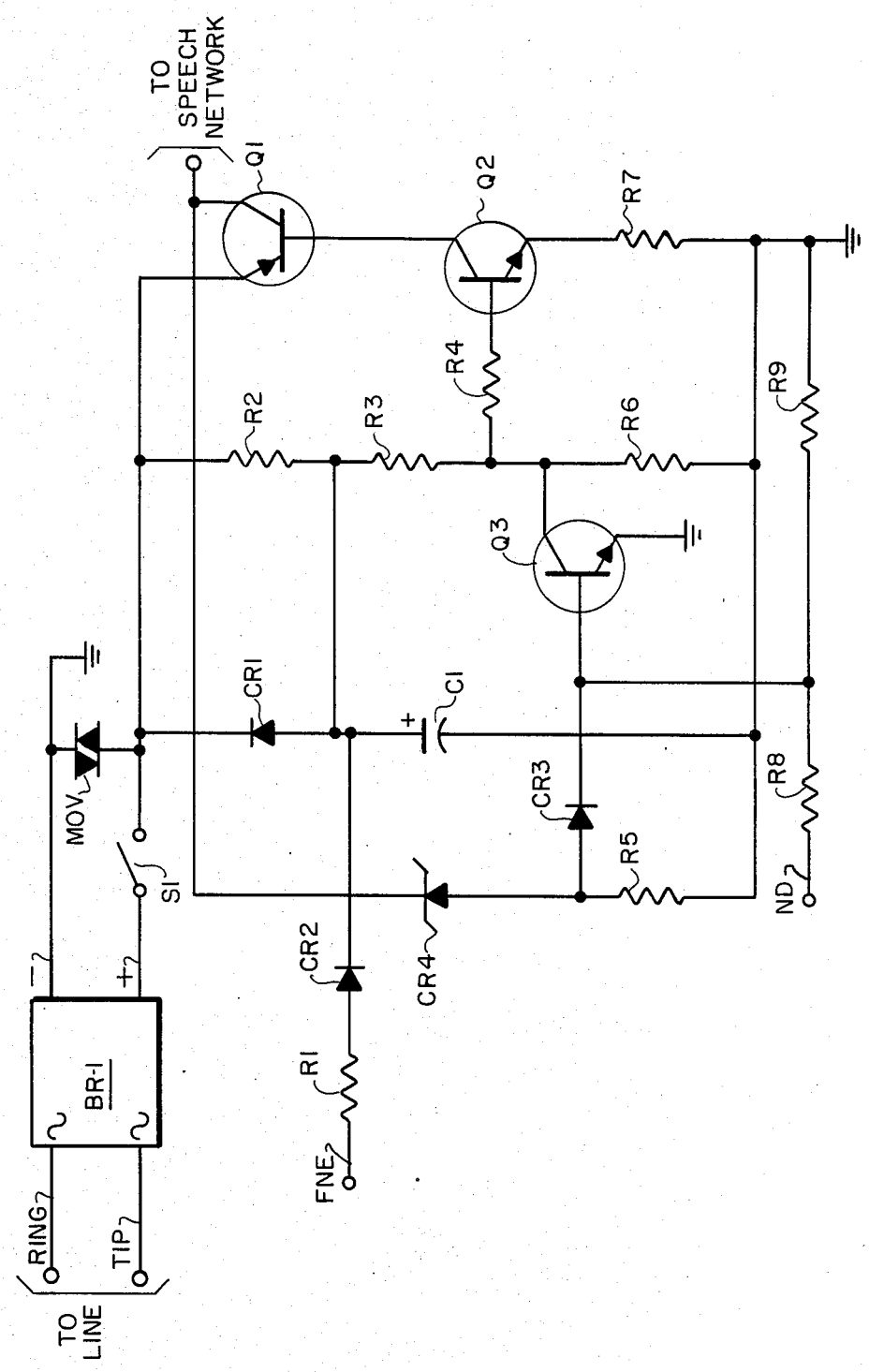

SURGE PROTECTED ELECTRONIC SWITCH FOR TELEPHONE VOICEBAND CIRCUITS

BACKGROUND OF THE INVENTION

1. Field of the Invention

The present invention relates to subscriber telephone instuments of the electronic-microprocessor type, and more particularly to telephone instruments which require fast connect and disconnect functions to the speech network, as a part of such operations as dialing, hold or flash signaling.

2. Background Art

Many previous designs of network disconnect circuitry involve the use of series pass elements such as a PNP type transistor. A prior art example of such a design is found in the "Linear II" telephone manufactured by GTE Communication Systems Corporation. In this particular implementation a Darlington PNP transistor arrangement was used to achieve the required saturation level of the switch. A third NPN type transistor was required to switch the two PNP transitors of the Darlington configuration "on" or "off". Each of the transistors used in this circuit implementation were high voltage types in order to withstand lightning surges which may appear on the telephone subscriber line. The described circuitry however does not protect the speech network from voltage surges. Instead it uses an external metalic oxide varistor for protection. For bias purposes in this arrangement, a pulldown resistor having a value on the order of 24,000 ohms was employed. The resulting low level of DC bias current combined with a high level of AC impedance, permits the electronic switch to become virtually transparent in regard to the receive, sidetone and transmit characteristics of a conventional hybrid voice network circuit. However, the circuit advantages are achieved at the cost of an extra PNP high voltage transistor and an increase in the switches "on" state voltage from approximately 0.3 volts DC to 0.7 volts DC.

An earlier example of the prior art is represented by the "Duofone 160" repretory dial telephone marketed by Radio Shack Incorporated. This circuit uses a single PNP type transistor for a series pass element where the "on" and the "off" state is controlled by a common emitter NPN transistor connected to the PNP transistor's base. AC isolation for these two high voltage transistors is provided by a series connected inductor and resistor coupled between the two transistors. In addition to cost and space factors, this circuit exhibits poor AC isolation at the low end of the voiceband frequencies. It also requires significant DC bias current to maintain the required level of saturation for the PNP transistor switch. Both of these factors can have a significantly degrade the accoustic characteristics of a telephone's voice network.

Accordingly, it is the object of the present invention to provide a low cost circuit which includes a electronic switch for telepone voice network applications which is transparent to the accoustic characteristics of the voice network, exhibits a low "on" state voltage drop and includes a means of surge voltage protection.

SUMMARY OF THE INVENTION

The present invention describes an electronic switch which is used to couple a voiceband circuit-speech network to the telephone subscriber's line employing a hookswitch and polarity correcting means. In the proposed circuitry, a first NPN type transistor receives positive bias from the telephone subscriber line through a high resistance voltage divider to circuit ground, forming an input voltage dependent bias source for this transistor. AC signals are significantly attenuated by the first high value resistor in the voltage divider and then shunted to circuit ground through a high value capacitor to achieve, in effect, a low pass filter. The output current is limited by a voltage dropping resistor in series with the NPN type transistor's base. This first NPN type transistor is operated as an emitter follower in the active region. The resistor in the emitter circuit allows the transistor to act as a DC input voltage controlled constant current source. The time constant of the low pass filter combined with the emitter resistor's effect, acts to minimize any response of the resulting current source to transient input voltages due to either lightning surges or ringing signals. The collector of this first NPN type transistor provides the current sink for the PNP type transistor forming the electronic switch element. The emitter of this PNP transistor is coupled to the positive side of the telephone subscriber line following the hookswitch. The collector, in turn, is connected to the voice network. Sufficient base current is sourced to the PNP transistor switch by the first NPN bias transistor to provide a highly saturated condition for the switching transistor when in the "on" state regardless of input loop voltage. Also due to the constant current source nature of this NPN bias transistor stage, a high AC impedance occurs in relation to the PNP tranistors input and output circuits thereby minimizing any audio losses due either to DTMF address signaling or voice signals.

During a voltage surge both the PNP switch and the attached voiceband circuitry are protected by an output voltage limiter. The present circuitry employs the current versus voltage characteristics of the attached voiceband circuitry to limit the conduction of current through the PNP transistor switch. This is accomplished by connecting a zener diode from the PNP transistor's collector to both a threshold sensing bias resistor connected to circuit ground and a first diode which is used to couple this output to the base of a second, common emitter connected NPN type transistor. The NPN transistor's collector is coupled to the aforementioned voltage dropping resistance and or the base of the first NPN type transistor in such a manner that it acts as a negative source of bias current.

When sufficient voltage appears at the PNP transistor switch's output to cause the output voltage limiting zener diode to conduct, positive bias is applied through the aforementitoned first diode to the base of the second NPN transistor. This transistor works with the first NPN transistor to effect a reduction in the bias current to the PNP switching transistor. Therefore, under surge conditions, the output voltage limiter acts to restrict the flow of current to the voiceband circuit. The second NPN type transistor also functions as a logic signal interface element that allows a microprocessor to signal a "network disconnect" command to disconnect a voiceband circuit such as the speech network by means of a cutoff of bias to the PNP transistor switch. This is accomplished by injecting a positive voltage due to a logic "high" input signal to the base of the second NPN transistor betweens its base connection and first diode. In this instance, total network disconnect occurs because the second NPN transistor switches on and drains virtually all the available bias current from the first NPN type transistor. As a result, the first NPN transistor's collector no longer conducts any bias current from the base of the PNP transistor switch such that the PNP transistor is turned off. In addition, the filter capacitor is discharged by the collector of the second NPN type transistor. When the "network disconnect signal" is switched back to a logic "zero" state approaching zero volts, the capacitor within the lowpass filter must be charged back up sufficiently to turn on the first NPN type transistor which then turns on the PNP switching transistor. This turn on delay can require several milliseconds. Electronic Industries Association (EIA) specification RS-470 prohibits serious opens which cause the subscriber line current to drop below 17 milliamperes for longer than one millisecond if the UDK (Universal Dial Keying) or DTMF (Dual Tone Multi frequency) dial out-address signaling sequence has not been completed. As a result, a speedup circuit is added to solve the problem of (UDK) pulse address signaling circuits which experience protracted periods between manually dialed digits. In this instance, the speech network is initially disconnected in order that loop current can only flow through the shunt dialer circuit preceding the electronic switch disconnecting the speech network. A seperate logic signal input is then utilized to provide a means of minimizing the spurious open circuit effect when the logic circuitry reconnects the speech network following an interdigital interval timeout. This logic signal's voltage is used to precharge the low pass filter capacitor such that the requirements of EIA specification RS-470 are satisfied. The series charging circuit consists of a second forward biased silicon diode and a current limiting resistor which is connected to this capacitor.

A third silicon diode is connected between the filter capacitor and the emitter input of the PNP switch which is also coupled to the telephone subscriber line. Under normal conditions, this diode is reversebiased so that the input voltage to the PNP transistor's emitter is larger than the voltage across the capacitor. When this situation is reversed, the diode becomes forward biased and acts as a discharge path for the low pass filter's capacitor. As such, the bias voltage available to the first NPN transistor is reduced and the base current used to bias the PNP transistor switch is also reduced. This process, then, is used to protect the PNP switching transistor and the connecting voiceband circuitry when the telephone is taken off hook and subjected to the high AC voltage sources (typically 86 volts AC+50 volts DC) used to ring the subscriber. This diode allows to the capacitor to discharge during the zero voltage crossing of the telephone subscriber line.

The circuitry of the present invention is particularly useful on those lines where lightning surge protection is required wherein the circuitry controlling the flow of surge current must protect both itself and the speech network. This circuitry is also efficient in controlling audio losses due to the high switch saturation level achieved and the high AC impedance of the biasing portion of the circuit.

BRIEF DESCRIPTION OF THE DRAWING

The single sheet of accompanying drawings shows a simplified schematic of a network connect-disconnect switch as part of a typical telephone instrument application in accordance with the present invention. It should be noted that detailed functions of the circuitry of the telephone other than the tip and ring inputs, polarity guard, hookswitch and varistor are not shown in as much as they do not form a portion of the present invention.

DESCRIPTION OF THE PREFERRED EMBODIMENT

Referring now to the accompanying drawing PNP transistor Q1 is the main switching element operating in saturation during the "on" state. Bias to transistor Q1 is provided by a constant current source comprising NPN transistor Q2 operating as an emitter follower in the active region. The operation of both transistors Q1 and Q2 are controlled by NPN transistor Q3. In conjunction with voltage limiting zener diode CR4 and diode CR3, transistor Q3 acts as a surge protection circuit for both the electronic switch and the attached voiceband circuitry connected at that terminal designated "to speech network". Alternately, the network disconnect (ND) logic signal input to transistor Q3 via resistors R8 and R9 provides an electronic means of selectively disconnecting the voiceband circuits from the telephone subscriber's line. A low pass filter, consisting of resistors R2, R3 and R6 and capacitor C1, provides an input voltage dependent DC bias supply for transistor Q2 in order that transistor Q1 can be maintained in a saturated "on" state and the electronic switch exhibits a high AC impedence. Diode CR1 provides a ringing signal surge protection means by discharging capacitor C1 during the AC waveform's zero voltage crossing. Resistor R1 and diode CR2 coupled between the "Fast Network Enable" (FNE) logic signal input and capacitor C1 provide a fast means to turn on the electronic switch.

The input voltage dependent, DC voltage controlled, current source is defined by the input voltage on the base of NPN transistor Q2 and the value of emitter resistor R7. The base of transistor Q2 is coupled to the output of a low pass filter by resistor R4. The input for this filter is connected to the emitter of the PNP transistor Q1, a surge voltage protection metalic oxide varistor MOV and the hookswitch S1 which is coupled to the positive side of the telephone subscriber line via diode bridge rectifier BR-1. The low pass filter consists of a voltage; divider includes resistor R2, R3 and R6 and capacitor C1, connected in parallel with the output resistor R6. The frequency response of this filter is such that the emitter-follower current source transistor Q2 is not significantly controlled by the 180 Hertz to 5,000 Hertz voice-band signals used in accordance with EIA specification RS-470, for the receive, transmit and sidetoned requirements for a telephone subscriber unit. As a result, the circuit shown in the accompanying drawing exhibits a very high value for the equivalent AC impedance at both its input and output terminals. A minimum time constant for the low pass filter appears to be indirectly defined by this same EIA specification which calls for a desired maximum of 5% for the receive signal's harmonic distortion. Assuming a fundamental frequency of 90 Hertz, then a time constant of greater than 35 milliseconds appears to be required. By comparison, the minimum frequency used for ringing signals has a half period of 32 milliseconds. This information was used to add additional surge protection to the circuit for those cases where the telephone goes "off-hook" in the presence of an applied AC ringing signal. First, diode CR1 was added to significantly discharge filter capacitors C1 via PNP transistor Q1 during the zero voltage crossing points of the AC voltage waveform appearing across the tip and ring inputs to the telephone subscriber line. Next the charging time constant of the low-pass filter was increased to be more than 65 milliseconds so that the output voltage across filter capacitor C1 is minimally increased during the subsequent charge interval. As a result the voltage applied to the current source transistor Q2 is decreased so that the collector-base current supplied to PNP transistor Q1 is greatly reduced. This PNP transistor subsequently can be current limited during the short interval required by the central office to terminate the ringing signal.

The circuitry of the present invention includes an "ND" logic signal input in order to effect a "Network Disconnect" via the non-conducting state of transistor Q1 when a logic "1" signal is applied to the "ND" input,. This logic 1 represents a voltage signal of approximately 2.5 volts. When the logic "1" signal is applied to the "ND" input, transistor Q1 is turned on forcing the voltage applied to the base of transistor Q2 to approach zero volts. The turn-off of transistor Q2 also causes transistor Q1 to cease conducting current. At some later time the "ND" input signal changes to a logic "zero" (less than 0.5 volts) causing transistor Q3 to turn "off" and transistor Q1 again behaves as a saturated switch connecting the speech network-voiceband circuitry to the subscriber line. This provision permits the circuit to be used in a UDK (Dial Pulse Address Signaling) application involving a shunt dialer circuit (not shown) connected between the hookswitch S1 and circuit ground. Unfortunately such an arrangement may generate a spurious open during the transistion from the dialer's conduction of loop current during an interdigital interval to the conduction of to loop current by the electronic switch circuit of this invention. This may be a problem during manual dial out since EIA specification RS470 forbids the generation of a spurious open, such that the subscriber's loop current drops to be less than 17 milliampures for longer than one millisecond, until the dialout is completed. The problem is resolved using the "FNE" logic signal input circuitry. Filter capacitor C1 is precharged via resistor R1 and diode CR2 before the shunt dialer ceases to conduct loop current. Furthermore, the electronic switch is then turned on by logic zero signal at the "ND" input, so that transistor Q3 no longer discharges capacitor C1 during this precharge period. As a result, the redirection of loop current from the shunt dialer circuit to the electronic switch is not characterized by the defined spurious open condition.

The electronic switch's output circuit to the speech network voice-band circuitry is protected from damaging surge voltages, especially lightning surge conditions, by a voltage limiter. The present circuitry uses NPN transistor Q3 to discharge filter capacitor C1 when transistor Q1's collector voltage exceeds the zener breakdown voltage of diode CR4 and conducts enough current through bias resistor R5 to forward bias both diode CR3 and the base emitter diode of transistor Q3. As a result, the voltage applied to the base of transistor Q2 is reduced so that the electronic switching transistor Q1 becomes current limited by the threshold voltage needed to operate the voltage limiter. Surge voltage inputs to transistor Q1 are limited to some maximum value by the varistor MOV.

It will be seen from the foregoing that the present invention discloses an electronic switch exhibiting a high degree of "on" state saturation regardless of the subscriber line's loop current and which exhibits a high value of AC impedance with regard to both its input and output terminals. Additional features include means for controlling the electronic switch's state using an externally supplied logic signal, the inclusion of a voltage limiter which both limits the maximum output voltage to the speech network voice-band circuitry and also current limits the electronic switch and the inclusion of current limiting means used to help protect the electronic switch and speech network voice-band circuitry from short-term, AC voltage surges due to applied ringing signals. It will also be obvious to those skilled in the art that numerous modifications may be made without departing from the spirit of the present invention which shall be limited only by the scope of the claims appended here to:

What is claimed:

1. A surge protected electronic switch adapted for connecting and disconnecting an associated telephone speech network to a telephone line, said electronic switch comprising: a switching element connected between said telephone line and said speech network; biasing means for said switching element comprising a constant current source connected to said switching element; a source of DC bias for said constant current source comprising a low pass filter connected between said telephone line and said current source; a series protection circuit connected between said speech network and said constant current source; a first input circuit connected between a source of logic signals and said switching element, operated in response to a first signal to enable said switching means to connect said speech network to said telephone line; and a second input circuit connected between said source of logic signals and said constant current source operated in response to a second signal to disable said switching means and thereby disconnect said speech network from said telephone line.

2. A surge protected electronic switch as claimed in claim 1 wherein: said switching element comprises a PNP type transistor operated in the saturated mode when said switching means are enabled in response to said first signal.

3. A surge protected electronic switch as claimed in claim 1 wherein: said constant current source comprises an NPN transistor operated as a emitter follower to control said switching element.

4. A surge protected electronic switch as claimed in claim 1 wherein: said low pass filter is operated as an input voltage dependent DC bias supply for said constant current source.

5. A surge protected electronic switch as claimed in claim 4 wherein: said low pass filter comprises an RC network operated to pass signals from said telephone line to said constant current source below the normal voice band.

6. A surge protected electronic switch as claimed in claim 1 wherein: said surge protection circuit comprises voltage limiting means, and an NPN transistor, connected between said speech network and said constant current source, said surge protection circuit operated to control said constant current source and said switching element.

7. A surge protected electronic switch as claimed in claim 1 wherein: there is further included unidirectional conducting means connected to said telephone line operated to provide protection for said switch from surges created by incoming ringing signals received over said telephone line.

8. A surge protected electronic switch as claimed in claim 1 wherein: there is further included a metalic oxide varistor connected across said telephone line to provide additional surge protection to said electronic switch.

* * * * *